(12) United States Patent
Nie et al.

(10) Patent No.: US 11,162,040 B2
(45) Date of Patent: Nov. 2, 2021

(54) METHOD FOR PREPARING LOW-SULFUR BIODIESEL

(71) Applicant: Zhejiang University of Technology, Hangzhou (CN)

(72) Inventors: Yong Nie, Hangzhou (CN); Fan Xia, Hangzhou (CN); Qinglong Xie, Hangzhou (CN); Meizhen Lu, Hangzhou (CN); Xiaojiang Liang, Hangzhou (CN); Yanbin Su, Hangzhou (CN); Jianbing Ji, Hangzhou (CN)

(73) Assignee: Zhejiang University of Technology, Zhejiang (CN)

( * ) Notice: Subject to any disclaimer, the term of this patent is extended or adjusted under 35 U.S.C. 154(b) by 13 days.

(21) Appl. No.: 16/619,488

(22) PCT Filed: Dec. 28, 2018

(86) PCT No.: PCT/CN2018/124625
§ 371 (c)(1),
(2) Date: Dec. 5, 2019

(87) PCT Pub. No.: WO2019/149007
PCT Pub. Date: Aug. 8, 2019

(65) Prior Publication Data
US 2020/0095511 A1 Mar. 26, 2020

(30) Foreign Application Priority Data
Jan. 30, 2018 (CN) .......................... 201810088660.8

(51) Int. Cl.
*C10L 1/02* (2006.01)
*C11C 3/06* (2006.01)
(Continued)

(52) U.S. Cl.
CPC .............. *C10L 1/026* (2013.01); *C11C 3/003* (2013.01); *C11C 3/06* (2013.01); *C11C 3/10* (2013.01);
(Continued)

(58) Field of Classification Search
CPC ............. C10L 1/026; C10L 2200/0263; C10L 2200/0476; C10L 2270/026;
(Continued)

(56) References Cited

FOREIGN PATENT DOCUMENTS

| CN | 101451071 A | 6/2009 |
|---|---|---|
| CN | 101993778 A | 3/2011 |

(Continued)

OTHER PUBLICATIONS

Study on Esterification and Deacidification of EMU Oil from High Acid Value Waste Oil, Liu Peng et al., Applied Chemical Industry, vol. Issue 7, p. 12421245, claims 1-8.

*Primary Examiner* — Ellen M McAvoy
*Assistant Examiner* — Chantel L Graham
(74) *Attorney, Agent, or Firm* — PROI Intellectual Property US; Klaus Michael Schmid

(57) ABSTRACT

The present invention relates to a method for preparing low-sulfur biodiesel. The method includes the following steps: subjecting raw crude oil to heat exchange, preheating, glycerol esterification reaction, flashing, cooling, transesterification, dealcoholization, sedimentation, and methyl ester rectification to obtain low-sulfur biodiesel up to the standard, where in the heat exchange process, the raw crude oil exchanges heat with flashed oil to recycle some heat, and glycerol and fatty acids in a distilled product subjected to flashing are reused for the glycerol esterification reaction; the dealcoholization process removes methanol in a system after the transesterification, and refined methanol recycled by methanol rectification is reused for the transesterification (Continued)

reaction; crude glycerol generated in the sedimentation process does not need to be treated and is directly used for glycerol rectification to obtain refined glycerol, and the refined glycerol is reused for the glycerol esterification reaction.

6 Claims, 1 Drawing Sheet

(51) Int. Cl.
*C11C 3/10* (2006.01)
*C11C 3/00* (2006.01)

(52) U.S. Cl.
CPC .............. *C10L 2200/0263* (2013.01); *C10L 2200/0476* (2013.01); *C10L 2270/026* (2013.01); *C10L 2290/06* (2013.01); *C10L 2290/08* (2013.01)

(58) Field of Classification Search
CPC .... C10L 2290/06; C10L 2290/08; C11C 1/08; C11C 1/10; C11C 3/003; C11C 3/02; C11C 3/06; C11C 3/10; Y02E 50/13
See application file for complete search history.

(56) References Cited

FOREIGN PATENT DOCUMENTS

| | | | |
|---|---|---|---|
| CN | 102964245 A | | 3/2013 |
| CN | 103468413 A | | 12/2013 |
| CN | 103834477 A | | 6/2014 |
| CN | 104403804 A | | 3/2015 |
| CN | 106800976 A | * | 6/2017 |
| CN | 106800976 A | | 6/2017 |
| CN | 108277090 A | | 7/2018 |
| CN | 103013681 A | | 4/2019 |
| WO | 2019149007 A1 | | 8/2019 |

* cited by examiner

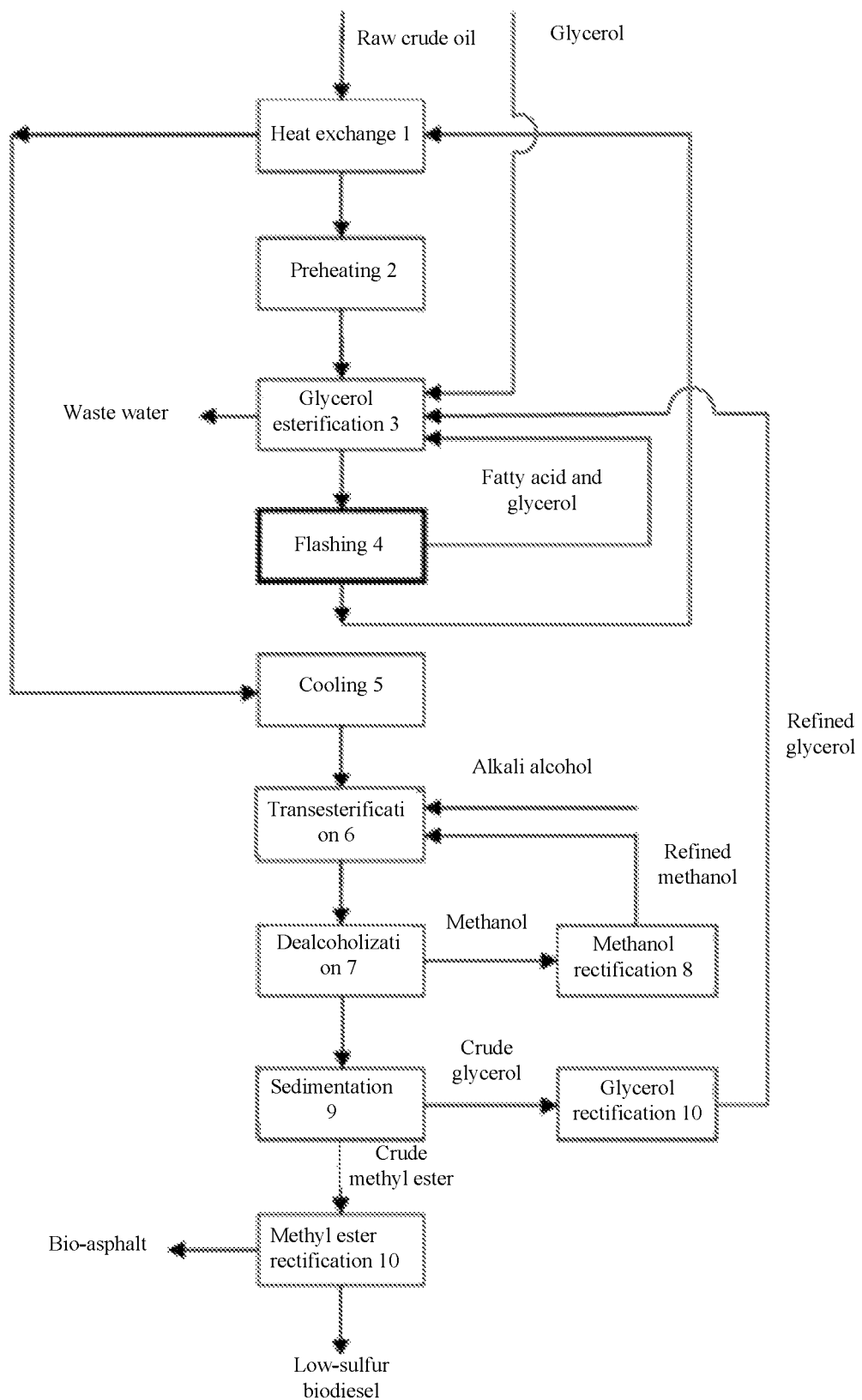

METHOD FOR PREPARING LOW-SULFUR BIODIESEL

TECHNICAL FIELD

The present invention belongs to the technical field of biodiesel preparation, and particularly relates to a method for preparing low-sulfur biodiesel, which is particularly suitable for clean and high-efficiency preparation of low-sulfur biodiesel from waste oil.

BACKGROUND

Oil is mainly composed of fatty acids and neutral oils. An important process for the production of biodiesel is acid reduction. The conventional acid reduction is performed mostly using an acid-catalyzed esterification method. The method will lead to the generation of waste acid that pollutes the environment and is difficult to handle, and the treatment cost is high.

As a method for efficient acid reduction, glycerol esterification reduces acids more thoroughly, and no waste acid water is generated. Chinese patent CN 105623861A discloses a glycerol esterification reaction device which has a simple structure, reasonable design and low energy consumption, and the acid value of the oil is rapidly reduced to below 0.5 mg KOH/g oil. Chinese patent CN205077009U discloses a device for glycerol esterification reaction of biodiesel, which strengthens the mass transfer process of raw crude oil and glycerol and increases the contact area between the material and glycerol, thereby accelerating the reaction rate. Chinese patent CN 105779139 A discloses a method for glycerol esterification of gutter oil, which greatly improves the yield during biodiesel synthesis by glycerol esterification and acid reduction of the gutter oil. Chinese patent CN104694256A discloses a method for reducing an acid value by solid base-catalyzed glycerol esterification, which includes adding glycerol and a solid base catalyst into dehydrated oil, vacuumizing the oil to remove water generated by the reaction, and filtering and recycling the catalyst after the reaction is completed to obtain an oil with the acid value less than 0.5 mg KOH/g oil.

The above methods can quickly reduce the acid, the acid value can be reduced to below 0.5, but there is still a small amount of fatty acid that is not converted, so that soap is generated during subsequent transesterification, which affects the stratification and recovery of crude glycerol; in the glycerol esterification and acid reduction process, excess glycerol needs to be introduced in order to reduce the acid, and excess glycerol is still dissolved in the oil after the glycerol esterification is completed, which affects the subsequent transesterification. Furthermore, none of the above processes and devices takes the removal of sulfur-containing compounds into account.

Chinese patent CN 106336919A discloses a novel method for desulfurization of biodiesel, which removes sulfur-containing compounds in biodiesel by two-stage high vacuum rectification. The method removes sulfur by two-stage high vacuum rectification based on the preparation of crude biodiesel, which has high requirements for separation of a rectifying tower, and the rectification cost is high. Chinese patent CN 105694999 B discloses a device and process for producing high-quality low-sulfur biodiesel. The method includes obtaining low-sulfur biodiesel by aeration, washing, ultrasonic processing, distillation three-stage desulfurization and esterification and rectification cutting of light components containing high sulfur, the process is complicated, the device investment is large, and much waste water is generated.

SUMMARY

An objective of the present invention is to overcome the deficiencies of the prior art, and to provide a method for preparing low-sulfur biodiesel, which is particularly suitable for preparing low-sulfur biodiesel from waste oil.

The objective of the present invention is accomplished by the following technical solutions. The method for preparing low-sulfur biodiesel includes the following steps: subjecting raw crude oil to heat exchange, preheating, glycerol esterification reaction, flashing, cooling, transesterification, dealcoholization, sedimentation, methyl ester rectification to obtain low-sulfur biodiesel up to the standard, where in the heat exchange process, the raw crude oil exchanges heat with flashed oil to recycle some heat, and glycerol and fatty acids in a distilled product subjected to flashing are reused for the glycerol esterification reaction; the dealcoholization process removes methanol in a system after the transesterification, and refined methanol recycled by methanol rectification is reused for the transesterification reaction; crude glycerol generated in the sedimentation process does not need to be treated and is directly used for glycerol rectification to obtain refined glycerol, and the refined glycerol is reused for the glycerol esterification reaction.

Preferably, the raw crude oil subjected to heat exchange is preheated to 200-240° C. in the preheating step.

Preferably, in the glycerol esterification reaction, the reaction conditions are normal pressure, a molar ratio 0.5:1-2:1 of glycerol to fatty acid, 200 to 240° C., and nitrogen purging, and the reaction time is 2-4 h.

Preferably, in the flashing process, the oil is flashed while the oil is hot after the glycerol esterification reaction, and the flashing pressure is 100-1000 Pa.

Preferably, in the cooling process, the oil having exchanged heat with the raw crude oil is cooled to 50-70° C. by water.

Preferably, the amount of methanol added in the transesterification is 20-40% the weight of the oil, the amount of KOH added is 0.5-2% the weight of the oil, and the reaction is carried out at 50-70° C. for 1-2 h.

Preferably, in the dealcoholization process, methanol and a trace amount of water in the system after the transesterification are removed by a multi-layer evaporation device.

Preferably, in the sedimentation step, the oil stands and sediments at 40-60° C. for 1-3 h.

In the present invention, the sulfur content of the refined methyl ester obtained in the methyl ester rectification process is less than 10 ppm, and high-boiling sulfur-containing compounds are enriched in bio-asphalt.

The method of the present invention is suitable for preparing low-sulfur biodiesel from various waste oils, and is applicable to gutter oil, soybean acidified oil and palm acidified oil, and the like.

By adopting the above technique, the present invention has the following beneficial effects compared with the prior art:

1. The glycerol esterification reaction does not require a catalyst, and no sulfuric acid wastewater is generated. The $N_2$ purging facilitates the evaporation of reaction product water, and the acid reduction is more thorough.

2. The difference between boiling ranges of the oil and low-boiling sulfur-containing compound is increased while acid reduction is performed by glycerol esterification, and some low-boiling sulfur-containing compounds can be removed.

3. Some sulfur-containing compounds in the oil are removed through flashing, and high-grade low-sulfur biodiesel is obtained through subsequent rectification.

4. By flashing the oil subjected to glycerol esterification, the remaining fatty acids in the oil are distilled out, thereby further reducing the acid, reducing the generation of soap, and avoiding foaming during glycerol rectification; and crude glycerol can be directly rectified without treatment, which is beneficial to glycerol recovery.

5. The unreacted glycerol in the glycerol esterification process is distilled off by flashing, which is favorable for the subsequent transesterification.

6. The oil is flashed while the oil is hot after glycerol esterification, the flashed oil exchanges heat with the raw crude oil to recover part of the heat, which greatly reduces energy consumption and reduces costs.

7. The distilled product subjected to flashing and refined glycerol obtained by glycerol rectification are reused for glycerol esterification reaction, and methanol obtained by multi-layer evaporation is rectified by methanol for transesterification, which reduces the consumption of glycerol and methanol, and saves cost.

8. The process is clean and efficient, and the low-sulfur biodiesel that meets EU standards can be stably produced.

BRIEF DESCRIPTION OF THE DRAWINGS

FIG. 1 is a schematic flow chart of an embodiment of the present invention.

Description of reference numerals of the accompanying drawing: 1. heat exchange, 2. preheating, 3. glycerol esterification reaction, 4. flashing, 5. cooling, 6. transesterification, 7. dealcoholization, 8. methanol rectification, 9. sedimentation, 10. glycerol rectification, 11. methyl ester rectification.

DETAILED DESCRIPTION

The present invention will be described in detail below with reference to the accompanying drawings and embodiments of the description, but the protection scope of the present invention is not limited thereto.

A crude biodiesel raw material used in Example 1 is waste oil (gutter oil), and the fatty acid methyl ester content distribution thereof is shown in Table 1:

TABLE 1

Table of content of each fatty acid methyl ester in biodiesel prepared from gutter oil

| Ingredient | $C_{14:0}$ | $C_{16:0}$ | $C_{18:0}$ | $C_{18:1}$ | $C_{18:2}$ | $C_{18:3}$ |
|---|---|---|---|---|---|---|
| Mass fraction | 0.764 | 18.897 | 2.237 | 35.998 | 36.923 | 3.869 |

As shown in FIG. 1, the raw crude oil is subjected to heat exchange 1 with oil subjected to flashing 4, and undergoes preheating 2 to 240° C., glycerol is added for glycerol esterification 3 (fresh glycerol is added during the first production and reused glycerol is added later), the temperature of the glycerol esterification 3 is controlled to 240° C., the reaction time is 3 h, and then flashing 4 (a distilled product subjected to flashing 4 can be reused for next glycerol esterification), the top temperature of the flashing 4 is 191° C. and operational absolute pressure is 500 Pa, the oil after the flashing 4 and the raw crude oil are subjected to heat exchange to recycle heat and then are subjected to cooling 5 to 60° C., methanol accounting for 40% the weight of the oil and KOH accounting for 1% the weight of the oil are added for transesterification 6, the temperature of the transesterification 6 is 60° C., and the reaction time is 1 h; after transesterification is completed, dealcoholization 7 (methanol is subjected to methanol rectification 8 and then reused for transesterification) is performed, and then sedimentation 9 is carried out to obtain crude glycerol and crude methyl ester, glycerol undergoes rectification 10 to obtain refined glycerol which can be repeatedly used for glycerol esterification 3, and methyl ester rectification 11 is performed to obtain low-sulfur biodiesel up to the standard, which conforms to the S10 standard in GBT 20828-2015; and a tower kettle obtains heavy components of the bio-asphalt.

Waste oil is used to prepare the biodiesel through the process. The results of mass and sulfur content of each material are shown in Table 2:

TABLE 2

Table of results of mass and sulfur contents of various materials in the process of preparation of low-sulfur biodiesel

| Material type | Sulfur content/ppm | Feed/output mass/g |
|---|---|---|
| Gutter oil raw material | 239.1 | 1000 |
| Glycerol esterification residue | 163.7 | 1115.2 |
| Oil generated by glycerol esterification | 852.2 | 4.2 |
| Water generated by glycerol esterification | 146.1 | 64.2 |
| Distilled product subjected to flashing | 41.2 | 91.6 |
| Flashing residue | 146.3 | 1020 |
| Distilled methyl ester | 8.2 | 806.8 |
| Heavy component of bio-asphalt | 316 | 102.6 |

The raw material of crude glycerol used in Example 2 is crude glycerol obtained by dealcoholization and sedimentation after transesterification in the process of preparing biodiesel by glycerol esterification. 60.1 g of crude glycerol is taken and directly rectified at an absolute pressure of 500 Pa and a top gas phase temperature of 161° C. without treatment. The raw material composition and rectification data is shown in Table 3. It can be seen from Table 3 that the crude glycerol obtained by the process can be directly distilled without the conventional acidification and soap removal process, and the glycerol recovery rate reaches 97.4%, which solves the problem of acid-containing wastewater generated by acidification of the glycerol recovery process.

TABLE 3 raw material composition and rectification data

| Name | Mass/g | Component | Mass content/% |
|---|---|---|---|
| Crude glycerol raw material | 60.1 | KOH | 3.8 |
| | | Glycerol | 60 |
| | | Others (colloid and polyglycerol) | 36.2 |
| Refined glycerol | 35.2 | Glycerol | 99.8 |
| Rectification residue | 21.2 | Glycerol | 1.5 |
| Glycerol rectification yield | | 97.4% | |

The above embodiments are only used to explain the present invention, but do not limit the protection scope of the present invention. Besides the above-mentioned embodiments, the technical solutions formed by equivalent replacement or equivalent transformation fall within the protection scope of the present invention.

What is claimed is:

1. A method for preparing low-sulfur biodiesel, comprising the following steps: subjecting raw crude oil to heat exchange, preheating, glycerol esterification reaction, flashing, cooling, transesterification, dealcoholization, sedimentation, methyl ester rectification to obtain low-sulfur biodiesel up to the standard, wherein in the heat exchange process, the raw crude oil exchanges heat with flashed oil to recycle some heat, and glycerol and fatty acids in a distilled product subjected to flashing are reused for the glycerol esterification reaction; the dealcoholization process removes methanol in a system after the transesterification, and refined methanol recycled by methanol rectification is reused for the transesterification reaction; crude glycerol generated in the sedimentation process is subjected to glycerol rectification to obtain refined glycerol, and the refined glycerol is reused for the glycerol esterification reaction;

wherein in the glycerol esterification reaction, the reaction conditions are normal pressure, a molar ratio 0.5:1-2:1 of glycerol to fatty acid, 200 to 240° C. and nitrogen purging, and the reaction time is 2-4 hours; and wherein in the flashing process the oil is flashed while the oil is hot after the glycerol esterification reaction, and the flashing pressure is 100-1000 Pa.

2. The method for preparing low-sulfur biodiesel according to claim 1, wherein the raw crude oil subjected to heat exchange is preheated to 200-240° C. in the preheating step.

3. The method for preparing low-sulfur biodiesel according to claim 1, wherein in the cooling process, the oil having exchanged heat with the raw crude oil is cooled to 50-70° C. by water.

4. The method for preparing low-sulfur biodiesel according to claim 1, wherein the amount of methanol added in the transesterification is 20-40% the weight of the oil, the amount of KOH added is 0.5-2% the weight of the oil, and the reaction is carried out at 50-70° C. for 1-2 hours.

5. The method for preparing low-sulfur biodiesel according to claim 1, wherein in the dealcoholization process, methanol and a trace amount of water in the system after the transesterification are removed by a multi-layer evaporation device.

6. The method for preparing low-sulfur biodiesel according to claim 1, wherein in the sedimentation step, the oil stands and sediments at 40-60° C. for 1-3 hours.

* * * * *